US012811288B2

(12) United States Patent
Zhu et al.

(10) Patent No.: US 12,811,288 B2
(45) Date of Patent: Nov. 24, 2026

(54) EPSILON-NEAR-ZERO METAMATERIAL ANTENNA AND DESIGN METHOD THEREFOR

(71) Applicant: ZHEJIANG UNIVERSITY, Hangzhou (CN)

(72) Inventors: Xiaokang Zhu, Hangzhou (CN); Dashuang Liao, Hangzhou (CN); Zuojia Wang, Hangzhou (CN); Liqiao Jing, Hangzhou (CN); Hongsheng Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/141,028

(22) PCT Filed: Jul. 11, 2024

(86) PCT No.: PCT/CN2024/104861
§ 371 (c)(1),
(2) Date: Jun. 18, 2025

(87) PCT Pub. No.: WO2025/044539
PCT Pub. Date: Mar. 6, 2025

(65) Prior Publication Data
US 2026/0213403 A1 Jul. 23, 2026

(30) Foreign Application Priority Data
Aug. 29, 2023 (CN) ......................... 202311100607.2

(51) Int. Cl.
*H01Q 1/52* (2006.01)
*H01Q 1/36* (2006.01)
*H01Q 9/16* (2006.01)

(52) U.S. Cl.
CPC ............. *H01Q 1/521* (2013.01); *H01Q 1/364* (2013.01); *H01Q 9/16* (2013.01)

(58) Field of Classification Search
CPC ........... H01Q 1/521; H01Q 1/364; H01Q 9/16
See application file for complete search history.

(56) References Cited

U.S. PATENT DOCUMENTS

2015/0054690 A1* 2/2015 Diaz ........................ H01Q 1/38
343/700 MS

FOREIGN PATENT DOCUMENTS

CN 104638366 A 5/2015
CN 110880642 A 3/2020
(Continued)

OTHER PUBLICATIONS

International Search Report dated Oct. 21, 2024 issued in PCT CN2024/104861.

*Primary Examiner* — David E Lotter
(74) *Attorney, Agent, or Firm* — Scully, Scott, Murphy & Presser, P.C.

(57) ABSTRACT

The present application relates to the field of communication technology, and in particular to an epsilon-near-zero metamaterial antenna and its design method. The epsilon-near-zero metamaterial antenna includes a first radiator, a second radiator, and a metamaterial structure; the metamaterial structure is arranged between the first radiator and the second radiator, and includes multiple metamaterial units, each of which is composed of a dielectric unit and a metal wire unit; and the metamaterial structure is used to generate electrical resonance in a preset direction to achieve a target near-zero permittivity in a preset communication frequency band. In the epsilon-near-zero metamaterial antenna described in the present application, by arranging a metamaterial structure between the first radiator and the second radiator, the isolation degree between the first radiator and
(Continued)

(a)

(b)

(c)

the second radiator is increased, thereby reducing the coupling between the first radiator and the second radiator, especially in the near-field.

10 Claims, 6 Drawing Sheets

(56) References Cited

FOREIGN PATENT DOCUMENTS

| | | | |
|---|---|---|---|
| CN | 112615163 | A | 4/2021 |
| CN | 117117508 | A | 11/2023 |

* cited by examiner (a) (b) (c)

(a)

(b)

EPSILON-NEAR-ZERO METAMATERIAL ANTENNA AND DESIGN METHOD THEREFOR

TECHNICAL FIELD

The present application relates to the field of communication technology, and in particular to a class of epsilon-near-zero metamaterial antennas and the design method.

BACKGROUND

An antenna is a device that radiates electromagnetic waves into space or receives electromagnetic waves, and it is an indispensable part of a communication system. Modern engineering systems such as radio communication, broadcasting, navigation, electronic countermeasures, remote sensing and the like rely on antennas to transmit or receive electromagnetic waves for information transmission. An electric dipole antenna is composed of a pair of symmetrically placed metal conductors, which feed the two ends of the conductors that are close to each other. Due to their excellent radiation performance, the coupling between the two becomes one of the main sources of interference, especially in the near field. Moreover, coupling can affect radiation performance and reduce communication efficiency. The commonly used decoupling methods in the prior art include increasing the spacing between antennas and using metal isolation plates. However, increasing the spacing to a certain extent will increase the sizes of devices, which is not advantageous for integration, and using isolation plates will affect the radiation performance of the antenna itself.

SUMMARY

In view of the above technical problems, the present application aims to provide a class of epsilon-near-zero metamaterial antennas to solve the problem that coupling can affect the antenna radiation performance.

A first aspect of the present application provides a class of epsilon-near-zero metamaterial antennas, which includes a first radiator, a second radiator, and a metamaterial structure; the metamaterial structure is arranged between the first radiator and the second radiator, and includes multiple metamaterial units, each of which is composed of a dielectric unit and a metal wire unit; and the metamaterial structure is used to generate electrical resonance in a preset direction to achieve a target near-zero permittivity in a preset communication frequency band.

In some embodiments of the present application, the first radiator includes a first conductor and a first feeding structure connected to the first conductor, and the second radiator includes a second conductor and a second feeding structure connected to the second conductor, both the first radiator and the second radiator being used for transmitting and/or receiving communication data.

In some embodiments of the present application, the metal wire unit includes one or more sets of metal wires with a preset width; and each of the metamaterial units is composed of the dielectric unit and the metal wire unit; and the one or more sets of metal wires with the preset width are mounted on a substrate surface of the dielectric unit.

In some embodiments of the present application, the metal wire unit is a set of metal wires mounted to a central area of the substrate surface of the dielectric unit; and the metal wire unit consists of multiple sets of metal wires, and a preset distance is provided between each set of metal wires.

In some embodiments of the present application, each set of metal wires is a multi-bend structure.

In some embodiments of the present application, the multi-bend structure is obtained by bending a metal wire by 90 degrees for multiple times on the substrate surface of the dielectric unit.

In some embodiments of the present application, a first support structure is further connected between the first radiator and the metamaterial structure.

In some embodiments of the present application, a second support structure is further connected between the metamaterial structure and the second radiator.

In some embodiments of the present application, the target near-zero permittivity is a real number or a complex number, and if the target near-zero permittivity is a complex number, then the real part of the target near-zero permittivity is a real number between −1 and 1.

A second aspect of the present application provides a design method for the epsilon-near-zero metamaterial antenna as described in any of the embodiments of the present application, which includes:

obtaining an ideal medium and simulating an epsilon-near-zero metamaterial antenna using the ideal medium; and determining the optimization degree of the target near-zero permittivity to the decoupling performance of the epsilon-near-zero metamaterial antenna based on simulation results.

The technical solutions provided in the embodiments of the present application at least have the following technical effects or advantages.

In the epsilon-near-zero metamaterial antenna described in various embodiments of the present application, by arranging a metamaterial structure between the first radiator and the second radiator, the isolation degree between the first radiator and the second radiator is increased on the basis of hardly affecting the radiation characteristics of the first radiator and the second radiator, thereby reducing the coupling between the first radiator and the second radiator, especially in the near-field. In particular, the metamaterial structure includes multiple metamaterial units, each of which is composed of a dielectric unit and a metal wire unit; and the metamaterial structure is used to generate electrical resonance in a preset direction, achieving the goal of reducing the permittivity of the dielectric unit to near-zero, i.e., achieving the target near-zero permittivity. Simulation of the epsilon-near-zero metamaterial antenna proves that the target near-zero permittivity can optimize the decoupling performance of the epsilon-near-zero metamaterial antenna.

It should be understood that the above general description and the following detailed description are only exemplary and illustrative, and cannot limit the present application.

BRIEF DESCRIPTION OF THE DRAWINGS

Upon reading the detailed description of the preferred embodiments below, various other advantages and benefits will become clear to those skilled in the art. The accompanying drawings are only used for the purpose of illustrating preferred embodiments, and should not be considered as a limitation to the present application. Moreover, throughout the drawings, the same reference signs are used to denote the same components. In the drawings.

It should be understood that the above general description and the following detailed description are only exemplary and illustrative, and cannot limit the present application.

DETAILED DESCRIPTION

Hereinafter, the present application will be further described in detail in connection with the accompanying drawings and embodiments. It can be understood that the embodiments described herein are only used to explain the relevant invention, not to limit the invention. In addition, it should also be noted that for ease of description, only the parts related to the relevant invention are shown in the accompanying drawings.

An antenna composed of symmetrically placed metal conductors can be, for example, a dipole antenna. The dipole antenna has always been the earliest and most widely used type of antenna with the simplest structure in communication systems. Two ends of the dipole antenna conductor that are close to each other are fed separately. Due to their excellent radiation performance, the coupling between the two becomes one of the main sources of interference, especially in the near field. Moreover, coupling can affect radiation performance and reduce communication efficiency. The commonly used decoupling methods in the prior art include increasing the spacing between the two poles of dipole antenna and using metal isolation plates. However, increasing the spacing to a certain extent will increase the sizes of devices, which is not advantageous for integration, and using isolation plates will affect the radiation performance of the antenna itself.

Figure 1:
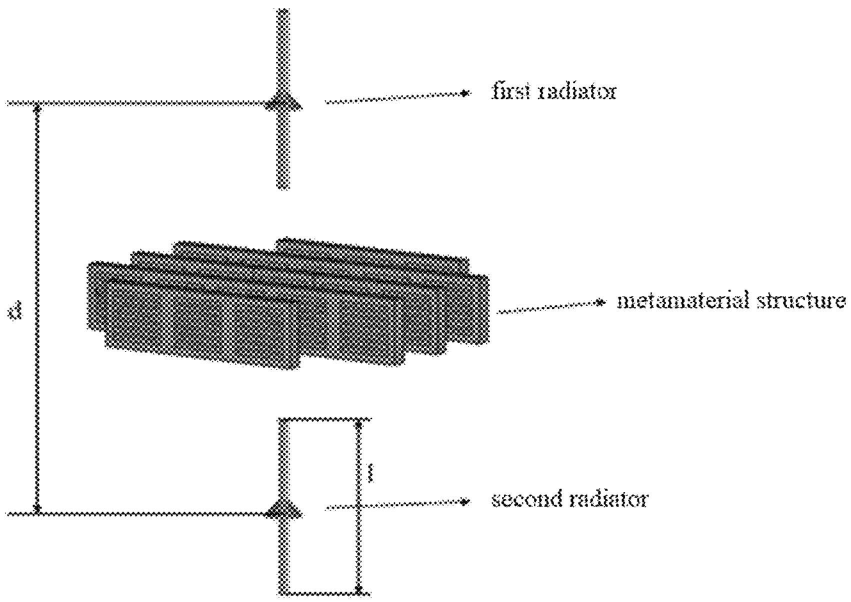
FIG. 1 shows a schematic diagram of the structure of an epsilon-near-zero metamaterial antenna in the prior art.

Therefore, in some embodiments of the present application, an epsilon-near-zero metamaterial antenna is provided. Referring to FIG. 1, the epsilon-near-zero metamaterial antenna includes a first radiator, a second radiator, and a metamaterial structure; the metamaterial structure is arranged between the first radiator and the second radiator to isolate the first radiator from the second radiator; the metamaterial structure includes multiple metamaterial units, each of which is composed of a dielectric unit and a metal wire unit; and the metamaterial structure is used to generate electrical resonance in a preset direction to achieve a target near-zero permittivity in a preset communication frequency band. Herein, the preset direction can be the z-axis direction. The first radiator includes a first conductor and a first feeding structure connected to the first conductor, and the second radiator includes a second conductor and a second feeding structure connected to the second conductor. Both the first radiator and the second radiator are used for transmitting and/or receiving communication data. As shown in FIG. 1, the distance between the two radiators is d, and the lengths of the first conductor and the second conductor are equal, each being l, where both l and d are larger than 0, and l is smaller than d.

In a specific implementation, the dielectric unit is a dielectric substrate, which is a commonly used type of PCB board in the industry. The preferred permittivity of the dielectric substrate is 2.2, and dielectric substrates with other dielectric constants can also be used. Specifically, dielectrics with different dielectric constants can be selected according to actual needs. However, in a specific implementation, if a dielectric substrate with a permittivity of 2.2 is used, which is a non-near-zero permittivity, it is necessary to mount metal wires on the surface of the dielectric substrate to reduce the permittivity of the metamaterial unit. Specifically, the metal wire unit includes one or more sets of metal wires with a preset width, each of the metamaterial units is composed of a dielectric unit and a metal wire unit, and the one or more sets of metal wires with the preset width are mounted on a substrate surface of the dielectric unit. The metal wire unit is a set of metal wires mounted to a central area of the substrate surface of the dielectric unit; the metal wire unit consists of multiple sets of metal wires, and a preset distance is provided between each set of metal wires, which is determined by the shape and size of the dielectric substrate. Optionally, the shape formed by the metamaterial unit can be rectangular, cylindrical, or convex lens shaped, etc.

Figure 2:
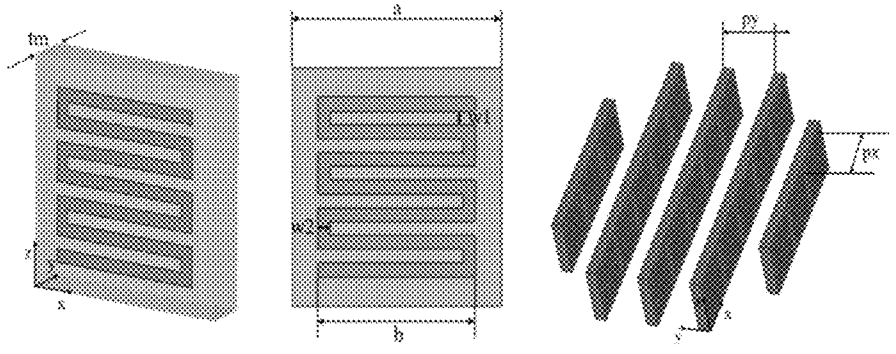
FIG. 2 shows a schematic diagram of the metamaterial structure in an exemplary embodiment of the present application.

In a specific implementation, referring to FIG. 2, each set of metal wires is a multi-bend structure. FIG. 2(*a*) shows a three-dimensional structure of a metamaterial unit, FIG. 2(*b*) shows the cross-section of a metamaterial unit, and FIG. 2(*c*) shows a three-dimensional structure of multiple metamaterial units. As shown in FIG. 2(*a*), the thickness of a metamaterial unit is tm. As shown in FIG. 2(*b*) and FIG. 2(*c*), the width of the dielectric substrate of the metamaterial unit is a, the side length of the bent metal wire is b, the spacing of the metal wire is w1, and the wire width is w2. As shown in FIG. 2(*c*), the distance between the metamaterial units is py, and the distance occupied by the bending structure composed of each set of metal wires on the x-axis is px. The multi-bend structure is obtained by bending a metal wire by 90 degrees for multiple times on the substrate surface of the dielectric unit. Specifically, in a preferred mounting method, for any set of metal wire with a preset width, it is mounted onto the surface of the dielectric substrate along a first direction until a first distance of mounting is completed; the remaining portion of the metal wire with the preset width after the first distance is excluded is bent to a second direction and mounted to the surface of the dielectric substrate along the second direction until a second distance of mounting is completed; the remaining portion of the metal wire with the preset width after the first distance and the second distance are excluded is bend to a third direction and mounted to the surface of the dielectric substrate along a third direction until a third distance of mounting is completed; the steps of mounting along the first direction, the second direction and the third direction are executed cyclically until this set of metal wire with the preset width is fully mounted; where the first direction is perpendicular to the second direction, the first direction is opposite to the third direction, and the first distance is equal to the third distance. The multi-bend structures produced by this mounting method is a rectangular wave structure. However, it is also possible to turn the metal wire into a rounded corner at the bend. The multi-bend structure generates electrical resonance in a preset direction, which can achieve a target near-zero permittivity in a preset communication frequency band, and also realize the miniaturization of the unit, making it easy to integrate.

In some embodiments of the present application, a first support structure is also connected between the first radiator and the metamaterial structure, and a second support structure is also connected between the metamaterial structure and the second radiator. The two support structures enable the first radiator including the first feeding structure, the metamaterial structure, and the second radiator including the second feeding structure to be connected or integrated into one piece. Support structures can also be provided between the multiple metamaterial units, and the two radiators are fed through the feeding structures to receive or transmit signals. The target near-zero permittivity is a real or complex number. If the target near-zero permittivity is a complex number, then the real part of the target near-zero permittivity is a real number between −1 and 1. The application of near-zero permittivity material increases the isolation degree between the two radiators such as dipole antennas, reducing interference between the two radiators in the near field, i.e., reducing the coupling degree. Specifically, taking the radiation of an electric dipole antenna in the near field as an example, the radiation field of a half-wavelength electric dipole antenna in the near field is expressed by the following formulas:

$$E_r = \frac{I_0 L\cos\theta e^{j\omega[t-(r/c)]}}{2\pi\varepsilon_0}\left(\frac{1}{cr^2} + \frac{1}{j\omega r^3}\right);$$

$$E_\theta = \frac{I_0 L\sin\theta e^{j\omega[t-(r/c)]}}{4\pi\varepsilon_0}\left(\frac{j\omega}{c^2 r} + \frac{1}{cr^2} + \frac{1}{j\omega r^3}\right); \text{ and}$$

$$H_\Phi = \frac{I_0 L\sin\theta e^{j\omega[t-(r/c)]}}{4\pi}\left(\frac{j\omega}{cr} + \frac{1}{r^2}\right).$$

Figure 3:
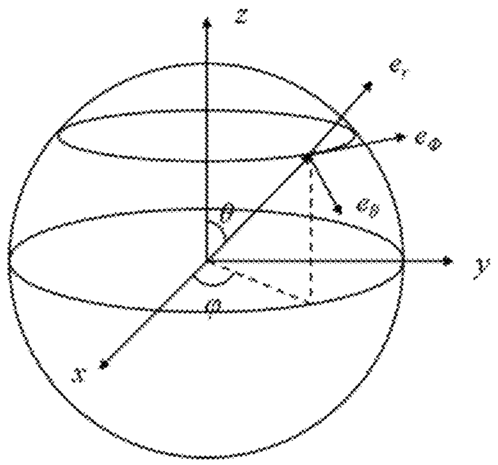
FIG. 3 shows a schematic diagram of the radiation of an electric dipole antenna in the near field in an exemplary embodiment of the present application.
Figure 4:
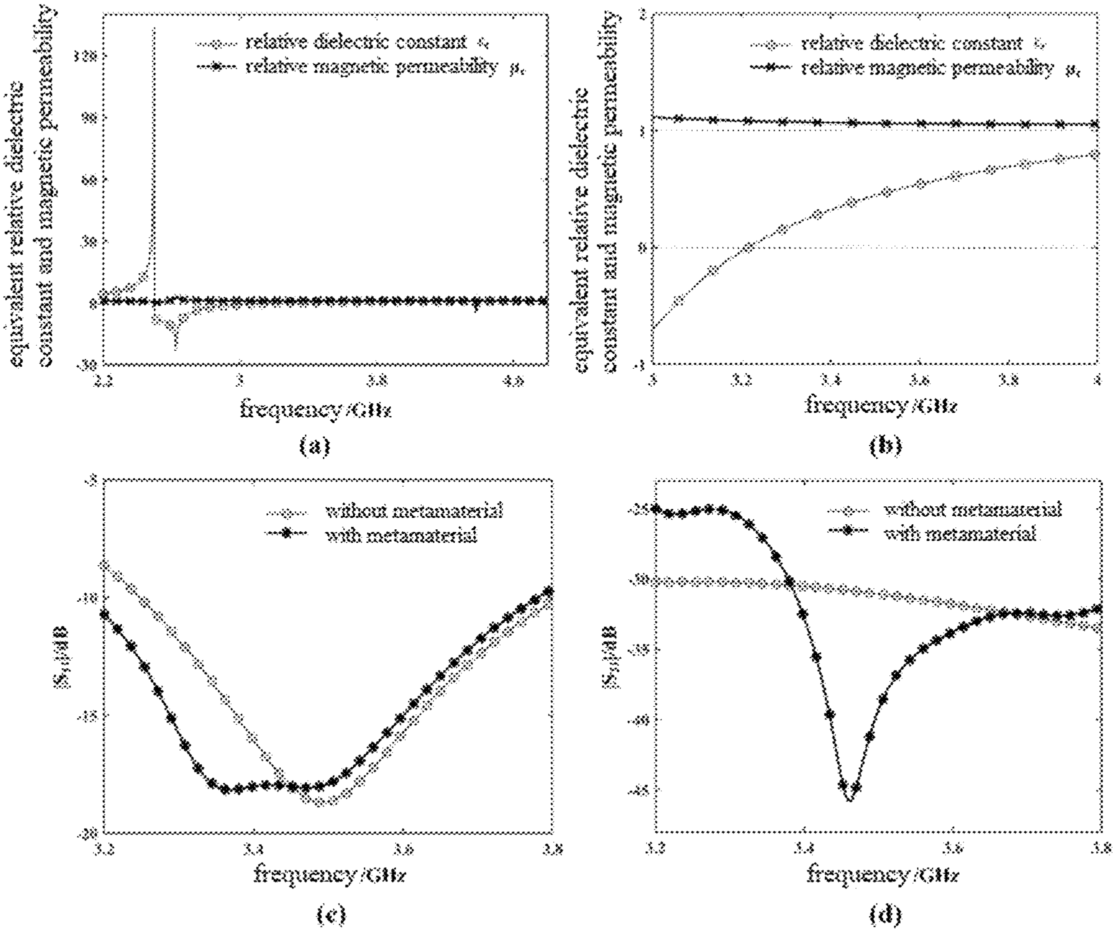
FIG. 4 shows a schematic curve of the technical effect of an epsilon-near-zero metamaterial antenna in an exemplary embodiment of the present application.

In the above formulas, referring to FIG. 3, $E_r$, $E_\theta$, and $H_\Phi$ represent the expressions of the components of electric field along three directions at a certain point in the near field. In the formulas, $I_0$ represents the amplitude of the current in the dipole, L represents the length of the dipole, ω represents the angular frequency of dipole oscillation, t represents time, r represents the distance from said point to the center of the dipole, c represents the speed of light, $\varepsilon_0$ represents the vacuum permittivity, and θ represents the size of the angle between the r direction and the z-axis at said point. The radiation of the electric dipole in the near field is different from that in the far field. This is because r is relatively small in the near field, so the term $E_r$ in the radiation of dipole cannot be ignored. $E_r$ is influenced by two parameters, r and θ. The closer θ is to 0, the smaller r is, and the stronger $E_r$ is, which is specifically manifested as an evanescent field along the r direction that rapidly decays as r increases. In the case described in this embodiment, because θ is almost zero and the spacing d between the two antennas is very small, the coupling between the antennas is mainly affected by the $E_r$ component, and the use of epsilon-near-zero material can weaken the intensity of the $E_r$ component at the other dipole. Referring to FIG. 4, the dipole antenna has an input reflection coefficient amplitude $|S_{11}|$ smaller than −10 dB within the operating frequency range of 3.3 GHz-3.7 GHz. When the epsilon-near-zero metamaterial is added between the dipoles, the amplitude of $S_{21}$ is reduced in the frequency range of 3.39 GHz-3.67 GHz compared to when no epsilon-near-zero metamaterial is added, and the input reflection coefficient $|S_{11}|$ after the metamaterial is added is still smaller than −10 dB within the operating bandwidth of 3.3 GHz-3.7 GHz. It can be seen that the interference degree (i.e., coupling degree) between the two radiators is reduced in the near field.

Figure 5:
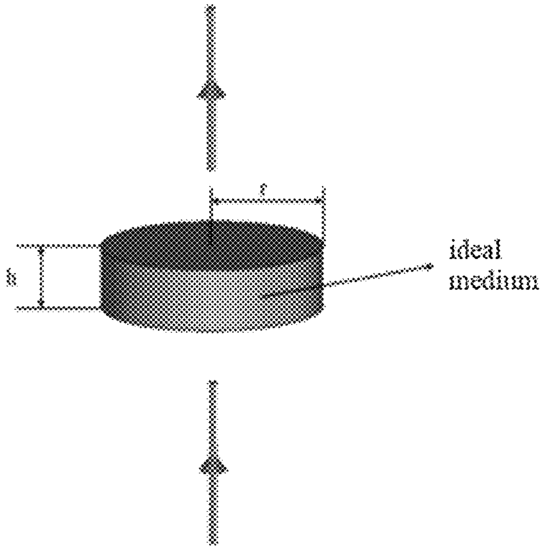
FIG. 5 shows a schematic diagram of an ideal medium in an exemplary embodiment of the present application.
Figure 6:
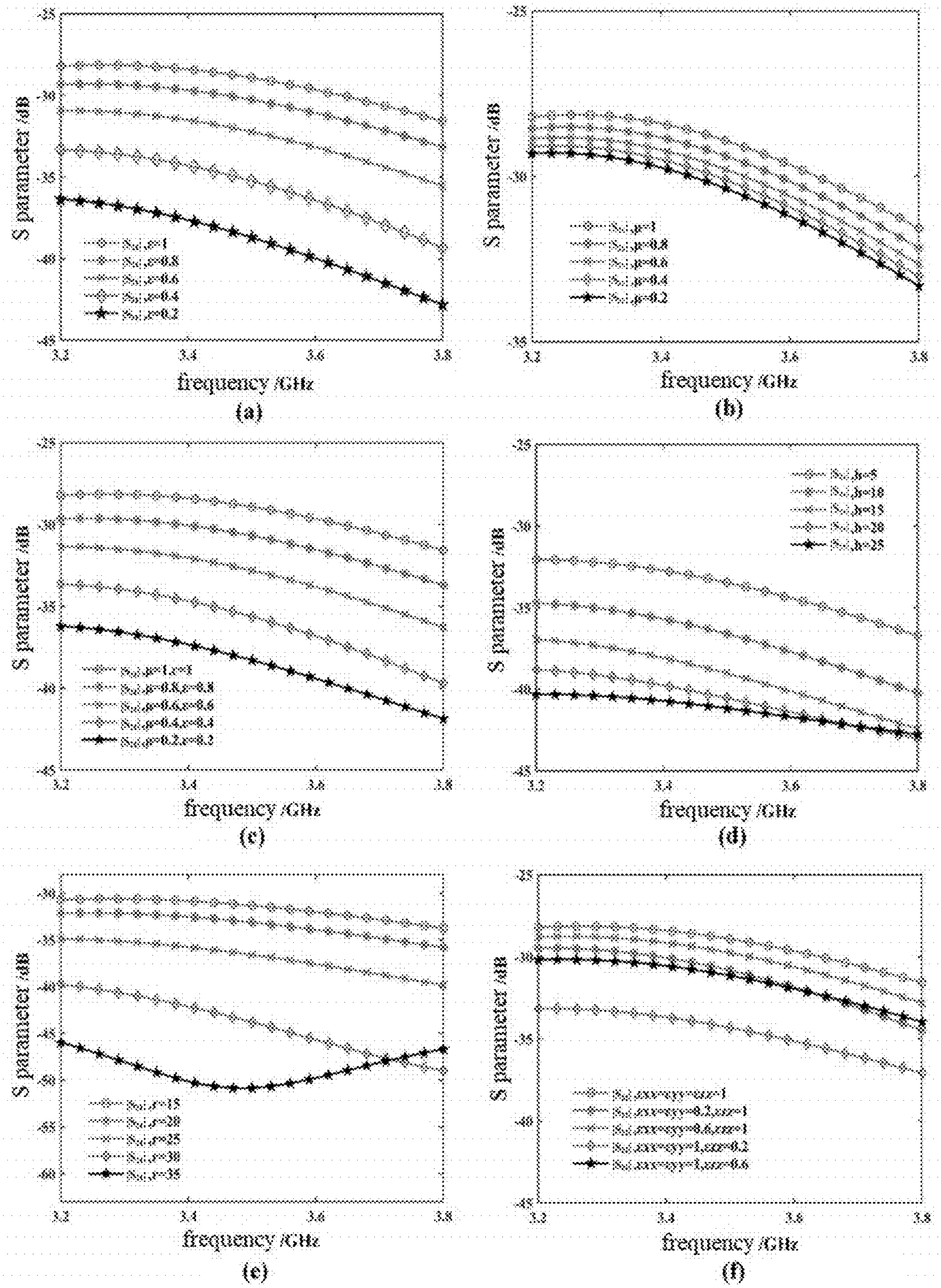
FIG. 6 shows a schematic diagram of the analysis of the influence of various parameters on the isolation degree of two radiators in an epsilon-near-zero metamaterial antenna.

In some embodiments of the present application, a design method for the epsilon-near-zero metamaterial antenna as described in any of the embodiments of the present application is also provided, with the purpose of verifying the isolation performance or decoupling performance of the epsilon-near-zero metamaterial antenna. The design method includes: obtaining an ideal medium and simulating a epsilon-near-zero metamaterial antenna using the ideal medium; and determining the optimization degree of the target near-zero permittivity to the decoupling performance of the epsilon-near-zero metamaterial antenna based on simulation results. As shown in FIG. 5, the ideal medium is cylindrical with a radius of r and a height of h. The relative permittivity and relative magnetic permeability of the ideal medium are $\varepsilon_r$ and $\mu_r$, respectively. In the simulation process, the influences of various parameters on the isolation degree of the radiators are analyzed. Firstly, the influence of the permittivity on the isolation degree is analyzed; for the ideal medium, let $\mu_r=1$, h=13.34 mm, and r=26.69 mm. The variation of $|S_{21}|$ with $\varepsilon_r$ in the frequency range of 3.2 GHz-3.8 GHz is shown in FIG. 6. It can be seen from FIG. 6(*a*) that as the permittivity approaches 0, $|S_{21}|$ shows a decreasing trend throughout the entire frequency band range, and approaches its limit when the relative permittivity reaches 0.2. At this point, the maximum value of $|S_{21}|$ is reduced by approximately 8 dB compared to when $\varepsilon_r=1$. Next, the influence of magnetic permeability on the isolation degree is analyzed; for the ideal medium, let $E_r=1$, h=13.34 mm, and r=26.69 mm. The variation of $|S_{21}|$ with $\mu_r$ in the frequency range of 3.2 GHz-3.8 GHz is shown in FIG. 6. It can be seen from FIG. 6(*b*) that as the magnetic permeability approaches 0, $|S_{21}|$ also shows a decreasing trend, but the magnitude of the decrease is smaller compared to when the permittivity is reduced. When the relative magnetic permeability reaches 0.2, at this point, the maximum value of $|S_{21}|$ decreases by approximately 1-2 dB compared to when $\mu_r=1$. If the permittivity and magnetic permeability are simultaneously changed to make h=13.34 mm and r=26.69 mm for the ideal medium, then the variation of $|S_{21}|$ with $\varepsilon_r$ and $\mu_r$ in the frequency range of 3.2 GHz-3.8 GHz is shown in FIG. 6. It can be seen from FIG. 6(*c*) that when the permittivity and magnetic permeability decrease simultaneously, the variation of the maximum value of $|S_{21}|$ is similar to the influence of only changing the permittivity on $|S_{21}|$.

Next, the influence of the thickness h and radius r of the medium on the isolation degree is analyzed, and the influence of medium anisotropy on the isolation degree is analyzed. For the ideal medium, let $\varepsilon_r=0.2$, μ=1, and r=26.69 mm, and the variation of $|S_{21}|$ with h in the frequency range of 3.2 GHz-3.8 GHz is shown in FIG. 6(*d*). For the ideal medium, let $E_r=0.2$, μ=1, and h=13.34 mm, and the variation of $|S_{21}|$ with r is shown in FIG. 6(*e*). It can be seen from FIG. 6(*d*) that $|S_{21}|$ gradually decreases with the increase of h, but when h reaches about 25 mm, the decrease of $|S_{21}|$ approaches its limit. It can be seen from FIG. 6(*e*) that $|S_{21}|$ also gradually decreases with the increase of r; as r increases, when r reaches 35 mm, the decrease of $|S_{21}|$ has not yet reached its limit. When analyzing the influence of medium anisotropy on the isolation degree, for the ideal medium, let $\mu_r$=1, h=13.34 mm, and r=26.69 mm. When the permittivity of the medium belongs to the five cases shown in FIG. 6(*f*), $|S_{21}|$ varies with frequency in the frequency range of 3.2 GHz-3.8 GHz. It can be seen from FIG. 6(*f*) that when reducing the equivalent relative permittivity $\varepsilon_{zz}$ in the z-direction, $|S_{21}|$ is significantly smaller than when the ideal medium is not loaded, and rapidly decreases with the decrease of $\varepsilon_{zz}$; when reducing the equivalent relative permittivity $\varepsilon_{xx}$ and $\varepsilon_{yy}$ in the x and y directions, $|S_{21}|$ is not significantly different from when the ideal medium is not loaded.

Figure 7:
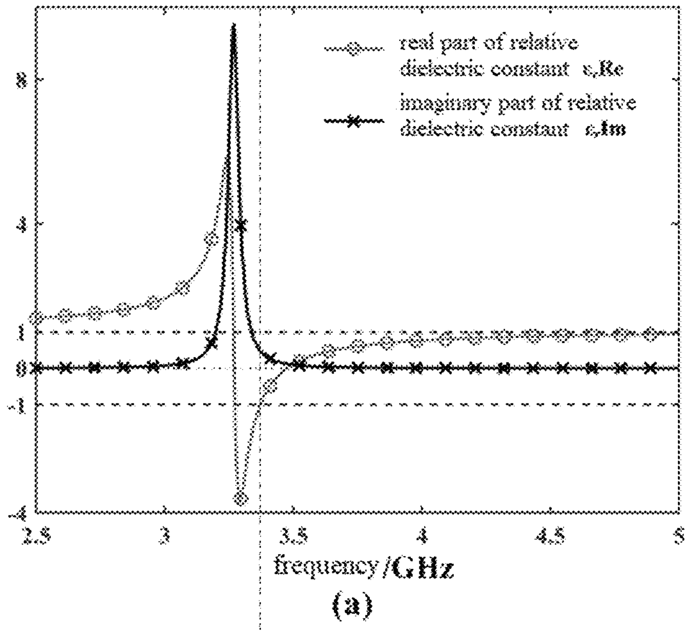
FIG. 7 shows another schematic diagram of the analysis of the influence of various parameters on the isolation degree of two radiators in an epsilon-near-zero metamaterial antenna.
Figure 7:
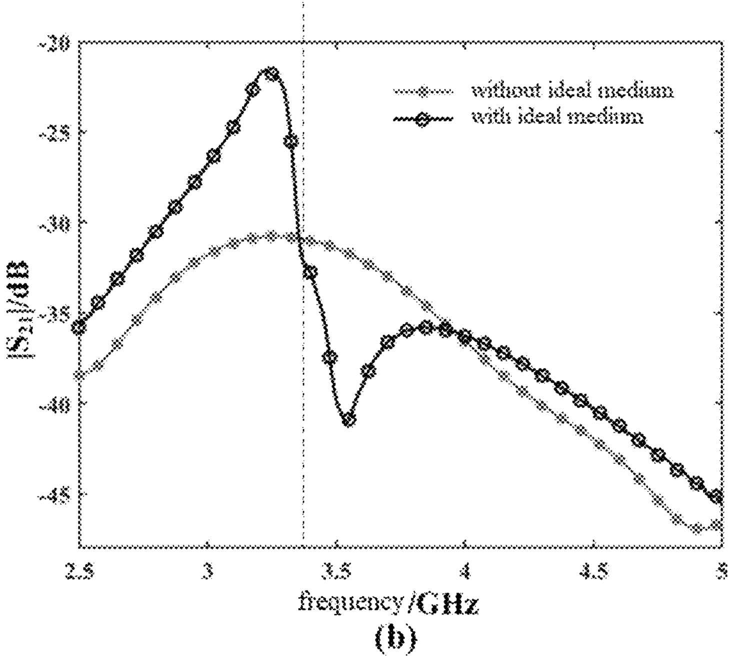

Further, the influence of negative permittivity medium on the isolation degree is analyzed; for the ideal medium, let $\mu_r$=1, h=20 mm, and r=27 mm. The relative permittivity $\varepsilon_r$ satisfies the Lorentz dispersion characteristics, with an epsilon of 1.05 at infinity, a static epsilon of 1.19, a resonant frequency of 3.25 GHz, and a damping frequency of 0.3 GHz. The real and imaginary parts of the permittivity of an ideal medium with the Lorentz dispersion parameters vary with frequency in the frequency range of 2.5 GHz to 5 GHz, as shown in FIG. 7. It can be seen from FIG. 7(*a*) that the real part of the relative permittivity of the ideal medium ranges from −1 to 1 in the frequency range of 3.355 GHz to 5 GHz. This ideal medium is placed between two dipole antennas. In the frequency range of 2.5 GHz-5 GHz, the $|S_{21}|$ parameter between the dipole antennas varies with frequency, as shown in FIG. 7(*b*). It can be seen from FIGS. 7(*a*) and 7(*b*) that when the real part of the relative permittivity of the ideal medium is between −1 and 1, $|S_{21}|$ in the frequency range of 3.36 GHz-3.96 GHz is smaller than $|S_{21}|$ when the ideal medium is not added, and when the permittivity is closest to 0, $|S_{21}|$ reaches the minimum value. The actual bandwidth being smaller than the theoretical bandwidth may be a result of the influence of factors such as the shape of the medium and simulation errors.

From the above simulation results, it can be concluded that in the embodiments of the epsilon-near-zero metamaterial antennas provided in the present application, the isolation effect is mainly affected by the equivalent relative permittivity $\varepsilon_{zz}$ in the z-direction. The closer the relative permittivity is to 0 within the range of −1 to 1, the larger the thickness and radius of the medium are, and the better the isolation effect between antennas is. Moreover, a near-zero magnetic permeability medium can also play a role in reducing the isolation degree between electric dipole antennas to a certain extent.

In the various embodiments of the epsilon-near-zero metamaterial antenna provided in the present application, the isolation degree is increased mainly by making the equivalent permittivity in the z-direction of the medium approach zero. Therefore, an electrical resonance structure formed by the metamaterial units is used to achieve the near-zero permittivity, and the most basic electrical resonance structure is a metal wire array. In practice, equivalent capacitance and inductance can be introduced by bending metal wires and similar methods to reduce the resonance frequency and unit size. For the electrical resonance unit used in the present application, the S parameter of the unit is calculated first. Based on the calculated S parameter results, the equivalent permittivity and equivalent magnetic permeability of the unit are inverted. The inversion results are shown in FIG. 4. It can be seen that the equivalent relative permittivity is between −1 and 1 within the operating frequency range of 3.3 GHz-3.7 GHz, which meets the purpose of making the permittivity approach zero as described in the present application. It can be understood that in practical applications, the epsilon-near-zero metamaterial structure has an influence on the isolation effect. The metamaterial units are arranged according to the arrangement method shown in FIG. 2, and the metamaterial will have an equivalent relative permittivity $\varepsilon_{zz}$ in a certain frequency band in the z-direction. According to the above analysis, in the frequency band where the equivalent relative dielectric constant $\varepsilon_{zz}$ in the z-direction of the metamaterial satisfies the near-zero characteristic, the $|S_{21}|$ parameter between dipole antennas will decrease. The calculated S parameter results show that when the $|S_{21}|$ of the transmitting antenna is almost unchanged, $|S_{21}|$ is significantly lower in the frequency range of 3.39 GHz-3.67 GHz compared to $|S_{21}|$ when the equivalent epsilon-near-zero metamaterial is not loaded, meeting the results of equivalent parameter analysis of the ideal medium mentioned above. In fact, the bandwidth when simulating using the actual structure of metamaterials is theoretically narrower than simulating a single unit, which may be influenced by other factors such as coupling between units, the imaginary part of equivalent permittivity, and the magnetic permeability. However, compared with other methods such as adding pec isolation plates, the method described in the present application has a smaller influence on the impedance matching of the input end and the antenna pattern. Therefore, it can be determined that the target near-zero permittivity has a significant optimization effect on the decoupling performance of the epsilon-near-zero metamaterial antenna. In the epsilon-near-zero metamaterial antenna, by arranging a metamaterial structure between the first radiator and the second radiator, the isolation degree between the first radiator and the second radiator is increased, thereby reducing the coupling between the first radiator and the second radiator, especially in the near-field. In particular, the metamaterial structure includes multiple metamaterial units, each of which is composed of a dielectric unit and a metal wire unit; and the metamaterial structure is used to generate electrical resonance in a preset direction, achieving the goal of reducing the permittivity of the dielectric unit to near-zero, i.e., achieving the target near-zero permittivity. Simulation of the epsilon-near-zero metamaterial antenna proves that the target near-zero permittivity can optimize the decoupling performance of the epsilon-near-zero metamaterial antenna.

It should be understood that the above general description and the following detailed description are only exemplary and illustrative, and cannot limit the present application.

Figure 8:
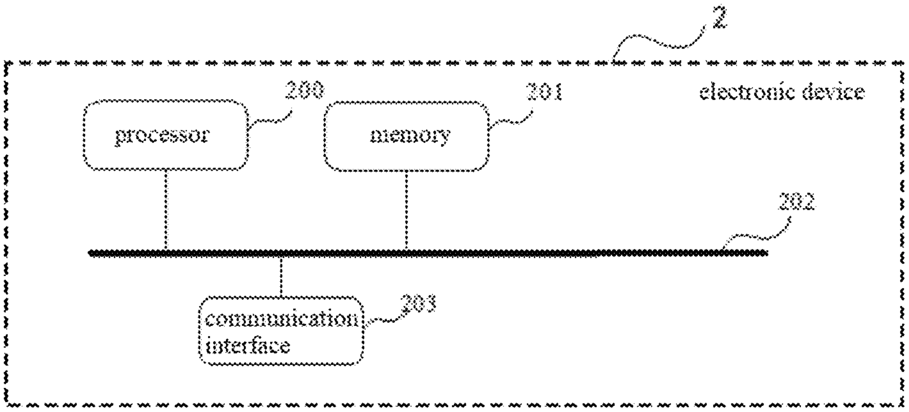
FIG. 8 shows a schematic diagram of the structure of an electronic device provided by an exemplary embodiment of the present application.

Referring to FIG. 8, a schematic diagram of an electronic device provided by some embodiments of the present application is shown below. As shown in FIG. 8, the electronic device 2 includes: a processor 200, a memory 201, a bus 202, and a communication interface 203. The processor 200, the communication interface 203, and the memory 201 are connected through the bus 202; and the memory 201 stores a computer program that can be run on the processor 200. When the processor 200 runs the computer program, it executes the design method for the epsilon-near-zero metamaterial antenna as described in any of the embodiments of the present application, with the purpose of verifying the isolation performance or decoupling performance of the epsilon-near-zero metamaterial antenna. The design method includes: obtaining an ideal medium and simulating an epsilon-near-zero metamaterial antenna using the ideal medium; and determining the optimization degree of the target near-zero permittivity to the decoupling performance of the epsilon-near-zero metamaterial antenna based on simulation results.

The memory 201 may include a high-speed random-access memory (RAM), and may also include a non-volatile memory, such as at least one magnetic disk storage. The communication connection between this system network element and at least one other network element is realized through at least one communication interface 203 (which may be wired or wireless), and the Internet, wide area network, local area network, metropolitan area network and the like can be used.

The bus 202 can be an ISA bus, a PCI bus, or an EISA bus, etc. The bus can be divided into address bus, data bus, control bus, etc. The memory 201 is used to store programs, and the processor 200 executes the program after receiving an execution instruction. The design method provided in any of the above embodiments of the present application can be applied to the processor 200 or implemented by the processor 200.

The processor 200 may be an integrated circuit chip with signal processing capabilities. In the implementation process, each step of the above method can be completed through integrated logic circuits of hardware in the processor 200 or through software instructions. The processor 200 mentioned above can be a general-purpose processor, including a Central Processing Unit (CPU), a Network Processor (NP), etc.; it can also be a digital signal processor (DSP), an application specific integrated circuit (ASIC), a field programmable gate array (FPGA) or other programmable logic devices, discrete gates or transistor logic devices, or discrete hardware components. The methods, steps, and logical diagrams disclosed in the embodiments of the present application can be implemented or executed. The general-purpose processor can be a microprocessor, or the processor can be any conventional processor, etc. The steps of the method disclosed in the embodiments of the present application can be directly executed by a hardware decoding processor, or executed by a combination of hardware and software modules in the decoding processor. The software modules can be located in mature storage media in the art, such as random-access memory, flash memory, read-only memory, programmable read-only memory, or electrically erasable programmable memory, register, etc. The storage medium is located in the memory 201, and the processor 200 reads the information from the memory 201 and completes the steps of the design method in conjunction with its hardware.

Embodiments of the present application also provide a computer-readable storage medium corresponding to the design method provided in the above embodiments, on which a computer program is stored. When the computer program is run by the processor, it will execute the design method provided in any of the above embodiments. Not only that, examples of the computer-readable storage media may also include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory, or other optical or magnetic storage media, which will not be listed exhaustively herein.

In addition, embodiments of the present application also provide a computer program product, which includes a computer program that, when executed by a processor, implements the steps of the design method for the epsilon-near-zero metamaterial antenna as described in any of the above embodiments. The steps include: obtaining an ideal medium and simulating an epsilon-near-zero metamaterial antenna using the ideal medium; and determining the optimization degree of the target near-zero permittivity to the decoupling performance of the epsilon-near-zero metamaterial antenna based on simulation results.

It can be understood by those skilled in the art that the various component embodiments of the present application can be implemented in hardware, or in software modules running on one or more processors, or in a combination thereof. It should be understood by those skilled in the art that in practice, microprocessors or digital signal processors (DSPs) can be used to implement some or all of the functions of some or all components in the virtual machine creation device according to the embodiments of the present application.

Described above are only preferred specific embodiments of the present application, but the scope of protection of the present application is not limited to this. Any changes or replacements that can be easily conceived by those skilled in the art within the technical scope disclosed by the present application should be covered within the scope of protection of the present application. Therefore, the scope of protection of the present application should be accorded with the scope of protection of the claims.

The invention claimed is:

1. An epsilon-near-zero metamaterial antenna, characterized by comprising a first radiator, a second radiator, and a metamaterial structure; wherein the metamaterial structure is arranged between the first radiator and the second radiator, and comprises multiple metamaterial units, each of which is composed of a dielectric unit and a metal wire unit; and the metamaterial structure is used to generate electrical resonance in a preset direction to achieve a target near-zero permittivity in a preset communication frequency band.

2. The epsilon-near-zero metamaterial antenna according to claim 1, wherein the first radiator comprises a first conductor and a first feeding structure connected to the first conductor, and the second radiator comprises a second conductor and a second feeding structure connected to the second conductor, both the first radiator and the second radiator being used for transmitting and/or receiving communication data.

3. The epsilon-near-zero metamaterial antenna according to claim 1, wherein the metal wire unit comprises one or more sets of metal wires with a preset width; and each of the metamaterial units is composed of the dielectric unit and the metal wire unit; and the one or more sets of metal wires with the preset width are mounted on a substrate surface of the dielectric unit.

4. The epsilon-near-zero metamaterial antenna according to claim 3, wherein the metal wire unit is a set of metal wires mounted to a central area of the substrate surface of the dielectric unit; and the metal wire unit consists of multiple sets of metal wires, and a preset distance is provided between each set of metal wires.

5. The epsilon-near-zero metamaterial antenna according to claim 3, wherein each set of metal wires is a multi-bend structure.

6. The epsilon-near-zero metamaterial antenna according to claim 5, wherein the multi-bend structure is obtained by bending a metal wire by 90 degrees for multiple times on the substrate surface of the dielectric unit.

7. The epsilon-near-zero metamaterial antenna according to claim 1, wherein a first support structure is further connected between the first radiator and the metamaterial structure.

8. The epsilon-near-zero metamaterial antenna according to claim 1, wherein a second support structure is further connected between the metamaterial structure and the second radiator.

9. The epsilon-near-zero metamaterial antenna according to claim 1, wherein the target near-zero permittivity is a real number or a complex number, and if the target near-zero permittivity is a complex number, then the real part of the target near-zero permittivity is a real number between −1 and 1.

10. A design method for the epsilon-near-zero metamaterial antenna according to claim 1, characterized by comprising:

obtaining an ideal medium and simulating an epsilon-near-zero metamaterial antenna using the ideal medium; and determining the optimization degree of the target near-zero permittivity to the decoupling performance of the epsilon-near-zero metamaterial antenna based on simulation results.

* * * * *